April 14, 1959 R. B. COULSON 2,882,441

TRAVELLING WAVE AMPLIFIER TUBES

Filed Oct. 11, 1956

INVENTOR:
Robert Bernard Coulson
BY: Baldwin & Wight
ATTORNEYS

United States Patent Office 2,882,441

Patented Apr. 14, 1959

2,882,441

TRAVELLING WAVE AMPLIFIER TUBES

Robert Bernard Coulson, Great Baddow, England, assignor to English Electric Valve Company Limited, London, England, a British company Application October 11, 1956, Serial No. 615,293

Claims priority, application Great Britain October 25, 1955

5 Claims. (Cl. 315—3.6)

This invention relates to travelling wave amplifier tubes, that is to say tubes in which amplification effect is obtained by interaction between an electron beam and a wave travelling in a delay line at substantially the same phase velocity as the velocity of propagation of said beam. More specifically the invention relates to such tubes of the kind in which an attenuator is provided in the field of an intermediate portion of the length of the delay line of the tube. The delay line is usually, though not necessarily, of helical form and the attenuator is usually, though not necessarily, in the form of a layer of resistive material such as carbon and is in the field of the delay line. The main purpose of the attenuator is, as is well known, to prevent the tube bursting into self oscillation when high gain is sought to be obtained.

According to currently accepted theory an attenuator provided in a travelling wave tube in this way reduces the gain for a number of reasons, the one that is relevant here being that it reduces the total length of effective line by an amount determined by the length of the attenuating region. Careful experiment, however, indicates that this is far from sufficient description of the effects of the attenuator. One fact experimentally found is that the effect of the attenuator differs with change in its position along the length of the line. If it is near the cathode end of the tube its effect as regards reduction of gain is considerably more than if it is placed elsewhere, while if it is put near the collector end of the tube it produces a very considerable reduction in the maximum power output which it is possible to take from the tube.

Considering the electron beam and the delay line of the tube as transmitting lines, usual current theory assumes that the travelling energy is distributed between these two lines over most of the length of the tube, but that over the portion where the attenuator is positioned, the wave energy is practically all in the beam, that in the delay line being absorbed by the attenuator. The experimentally found phenomena above mentioned indicates that this assumption is not correct, or at any rate is not sufficient. While the full mechanism of the effects which the presence of the attenuator causes is still obscure, it is believed that modes of propagation other than the wanted mode occur over the length of line spanned by the attenuator and that those modes, once set up in the beam, do not provide the desired coupling with the part of the delay line subsequent to said length, so that considerable reduction in efficiency and maximum power output occurs. Whether or not this belief is correct and sufficient, experiment has shown that the invention now to be described does provide a substantial improvement over known tubes.

According to this invention a travelling wave tube in which amplification effect is obtained by interaction between an electron beam and a wave travelling in a delay line at substantially the same phase velocity as the velocity of propagation of the beam and of the kind in which an attenuator is provided in the field of an intermediate portion of the length of said delay line comprises means for substantially eliminating the amplifying interaction between said wave and said beam at least over a portion of said length.

Preferably the means for substantially eliminating the amplifying interaction over said portion comprises means for changing the phase velocity over said portion as compared to that which exists elsewhere in the line. It is, however, possible to carry out the invention by substantially preventing coupling of the beam with the wave in the line over said portion of length.

In one embodiment of the invention, as applied to that common form of travelling wave tube in which the delay line is of helical form, the pitch of the helix is increased over the said portion of length as compared to that which exists elsewhere. Increasing the helix pitch over the said portion of length is preferable to decreasing it because the increased pitch reduces the liability to flash-over between turns of the helix when the travelling wave tube is used near a high power transmitter. Preferably change in phase velocity in the line—in the preferred case change of helix pitch—is effected gradually at the two ends of the said portion of length to and from a uniform changed value over the middle of said portion of length.

The invention is illustrated in the accompanying drawings which illustrate diagrammatically three embodiments of the invention as applied to travelling wave tubes of the type having a helical delay line, in which.

Figure 1:
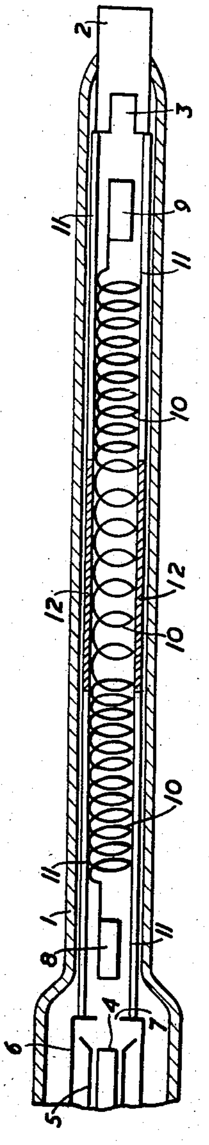
Fig. 1 illustrates a travelling wave tube of the type according to this invention in which the pitch of the helix in the center is larger than that at each side.

Referring to Fig. 1 the tube therein illustrated comprises an evacuated glass envelope 1 having at one end a collector electrode 2 with the usual central "well" 3. At the other end of the tube there is a cathode 4 which is heated by an internal heater (not shown) this cathode, together with a focussing electrode 5 and an accelerating anode 6 having an aperture 7 constituting an electron gun adapted to eject a beam of electrons axially towards the collector. In accordance with known practice an axial metal cylinder 8 is provided near the gun end of the tube and an axial metal cylinder 9 is mounted near the collector end. Connected to and extending between the cylinders 8 and 9 is a helical delay line 10. The delay line is held in its correct position by means of three insulating rods 11 at 120°—only two of these rods appear in the figure—the main length of the envelope being of triangular section and the rods lying in the corners of the envelope and contacting the helix so as to position it accurately with reference to the axis. A central portion of the length of each rod is coated with graphite or other suitable lossy material, the said coatings constituting an attenuator. The coatings on the two quartz rods shown in the figure are indicated by cross hatching 12.

In a known travelling wave tube the helical line would be of constant pitch throughout, the pitch being so chosen as to obtain closely approximate equality as between the phase velocity of the wave in the line and the velocity of the electrons in the beam. In accordance with this invention, however, the pitch of the helix is changed over the portion of length spanned by the graphite coatings 12 as compared to that which it has elsewhere. As shown the pitch is increased over the said portion of length. In one practical embodiment the overall length of the delay line is 6¼ inches; the first two inches (first starting at the cathode end) has 50 turns per inch; over the next quarter of an inch the pitch is gradually increased from 50 turns per inch to 20 turns per inch; over the next three-quarters of an inch the pitch is maintained constant at 20 turns per inch; over the next quarter of an inch the pitch is gradually changed back to 50 turns per inch; and over the last three inches the pitch is maintained at the original value of 50 turns per inch. The graphite coatings are each 1 inch long and are alongside the portion of the helix between the two 50 turns-per-inch lengths. These dimensions are, of course, purely exemplary and in no sense limiting. The reason for gradually changing the number of turns per inch from 50 to 20 and then back to 50 is to reduce undesired reflection effects in the line due to the sharp discontinuities which would occur if the pitch changes were sharp and sudden. In Fig. 1 the helix is only schematically represented, as also is the change of pitch thereof, it being impracticable to show the helix to scale.

Figure 2:
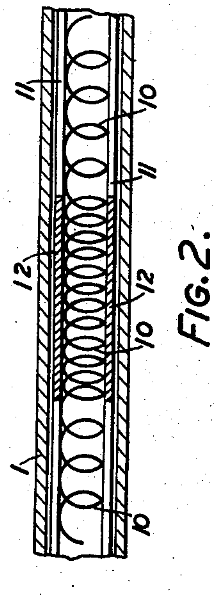
Fig. 2 shows an arrangement of helix in which the pitch in the center within the attenuator is smaller than that at either end.

Fig. 2 shows the central portion of a modified form of tube in accordance with the invention and suitable for use in cases where the operating powers and voltages are not too high. The difference between the tubes of Figs. 1 and 2 is that, in the tube of the latter figure, the pitch of the helix is decreased (instead of being increased) over the attenuating region as compared to that outside the said region. This embodiment has the advantage, over that of Fig. 1, that for the same total attenuation the length of the attenuating region can be shortened thereby reducing, to some extent, decrease in the overall gain of the tube.

Figure 3:
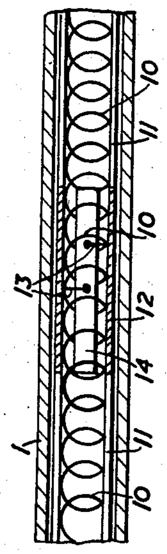
Fig. 3 shows an arrangement wherein an electrostatic screen is used for the purpose of preventing coupling with the wave in the line over the beam along the portion where the attenuator is located.

In the modification partly shown in Fig. 3 an electrostatic screen is provided inside the helix and around the beam to prevent coupling between the two over the attenuating region. As shown the screen is constituted by a drift tube 14 of about the same length as the attenuating region this tube concentrically surrounding the beam and being connected to the helix by connectors such as 13 which also provide mechanical support for it.

I claim:

1. A travelling wave tube comprising an electron gun, a collector electrode positioned to receive an electron beam from said gun, a continuous delay line having a phase velocity substantially equal to the velocity of propagation of said beam, said delay line surrounding said beam and extending over the major portion of the length of said beam, an attenuator situated in the field of an intermediate portion of said delay line and means substantially decoupling said beam and said delay line over at least a part of said intermediate portion.

2. A travelling wave tube comprising an electron gun, a collector electrode positioned to receive an electron beam from said gun, a continuous helical delay line surrounding said beam and extending over the major portion of the length of said beam, and an attenuator situated in the field of an intermediate portion of said delay line, said delay line being of such pitch over at least part of said portion as substantially to decouple said delay line and said beam, and of such pitch over the remainder of its length as substantially to couple said delay line and said beam.

3. A travelling wave tube according to claim 2, wherein the pitch of said continuous helical delay line over at least part of said portion is greater than the pitch of the remainder of said line.

4. A travelling wave tube according to claim 2, wherein the pitch of said continuous helical delay line over at least part of said portion is less than the pitch of the remainder of said line.

5. A travelling wave tube according to claim 1, wherein said means substantially decoupling said beam and said continuous delay line comprises a tubular electrostatic screen surrounding said beam within at least part of said intermediate portion of said delay line and located between said beam and said line.

References Cited in the file of this patent

UNITED STATES PATENTS

| | | |
|---|---|---|
| 2,575,383 | Field | Nov. 20, 1951 |
| 2,584,597 | Landauer | Feb. 5, 1952 |
| 2,752,430 | Watkins | June 26, 1956 |
| 2,757,310 | Robinson | July 31, 1956 |
| 2,771,565 | Bryant | Nov. 20, 1956 |
| 2,788,464 | Geiger | Apr. 9, 1957 |